Jan. 12, 1971  A. R. HILDEBRANDT  3,555,477

ELECTRICAL INDUCTOR AND METHOD OF MAKING THE SAME

Filed Jan. 21, 1969

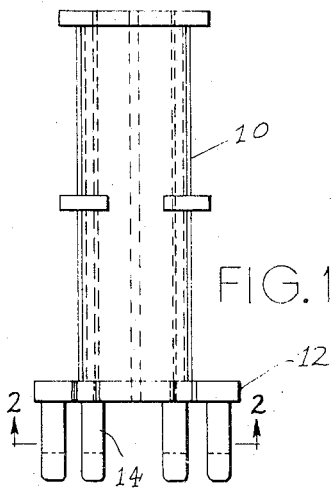

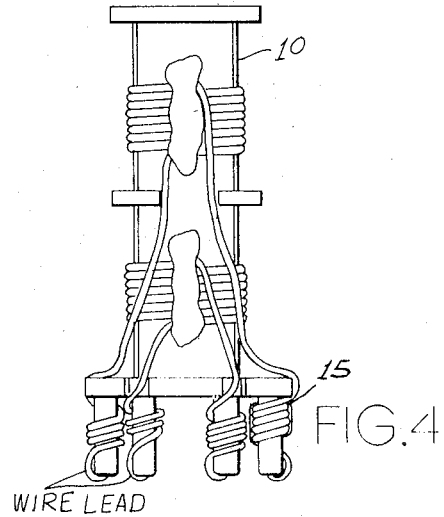

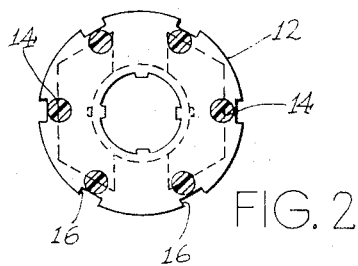

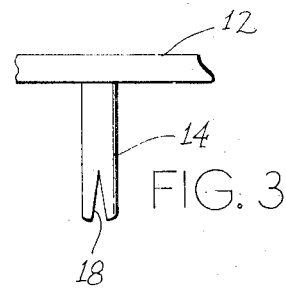

```
┌─────────────────────────────┐
│  WIND COIL ABOUT COIL FORM  │
└─────────────┬───────────────┘
              │
┌─────────────▼───────────────┐
│  WIND EACH COIL LEAD ABOUT  │
│  RESPECTIVE COIL FORM       │
│  MOUNTING FEET              │
└─────────────┬───────────────┘
              │
┌─────────────▼───────────────┐
│  SECURE ENDS OF COIL LEADS  │
│  TO RESPECTIVE MOUNTING FEET│
└─────────────┬───────────────┘
              │
┌─────────────▼───────────────┐
│  APPLY SOLDER COAT          │
│  TO WOUND LEADS             │
└─────────────────────────────┘
```

FIG. 5

INVENTOR/S

ALBERT R. HILDEBRANDT

BY *Melville, Strasser, Foster and Hoffman*
ATTORNEYS

United States Patent Office 3,555,477
Patented Jan. 12, 1971

3,555,477
ELECTRICAL INDUCTOR AND METHOD OF MAKING THE SAME
Albert R. Hildebrandt, Cincinnati, Ohio, assignor to Standard International Corp., Cincinnati, Ohio, a corporation of Ohio
Filed Jan. 21, 1969, Ser. No. 792,328
Int. Cl. H01j *15/10*
U.S. Cl. 336—192                     5 Claims

ABSTRACT OF THE DISCLOSURE

An electrical component comprising a coil form composed of a coil cage with a wound coil thereabout, and a base plate having mounting feet for insertion into a circuit board, and characterized by the feature that each coil termination is wound about a different foot and a solder coating is applied thereto to bond the individual turns to one another forming a solid metallic cylinder around said feet; and the method of making same.

BACKGROUND OF THE INVENTION

The field of invention to which this application is directed is the field of electrical components such as found in the related applications, Ser. No. 748,126, by Albert R. Hildebrandt, and Ser. No. 684,061 by Willard O. Chaney. While these applications define their inventions in terms of a small transformer, the application herein will be directed generally to the application of its unique principles and steps as applied to a coil of wire wound about a coil form. For convenience, a coil form may be defined by its basic components, i.e., cylindrical cage and mounting base integral therewith.

In operation, electrical components such as generally described above are utilized in various electrical apparatus by mounting on a circuit board which has been provided with a printed circuit on one surface thereof. To secure the component to the circuit board, particularly where the coil wire is relatively heavy, the coil ends are passed through holes in the mounting board and soldered to the appropriate element of the printed circuit.

However, in electrical structures where miniaturization is a consideration and the coil utilizes a relatively fine wire, problems arise since the coil ends are too flimsy to provide mounting feet or connections to the printed circuit. In situations such as this, it has been the practice to secure to the coil form an appropriate number of so-called transition lugs of metal to serve as mounting lugs and to carry the current through the board to the circuit elements to which the coil was to be connected. However, with this construction, it was necessary first to carry out an operation to secure the transition lugs to the coil form, then an operation to solder the coil ends to appropriate ones of the transition lugs and finally when the coil form was mounted on the board, the transition lugs had to be soldered into the electrical circuit. This type of operation did not lend itself to automation, thus adding to the production costs.

SUMMARY OF THE INVENTION

According to the preferred embodiment of this invention, a system has been devised for making terminal connections on an electrical component in an economical manner. More particularly, the invention contemplates the provision of a coil form having an end plate integral therewith, and mounting feet projecting from said end plate. Around the cage of the coil form there is provided a wound coil whose free ends are secured on a different one of each said feet by winding thereabout. A final operation in preparing the terminal connection involves the application of a solder coating to the wound portion about each foot to bond the individual turns to one another forming a solid metallic cylinder around the foot. Finally, a slot may be provided in the end of the foot for receiving the unsoldered free end of the coil.

BRIEF DESCRIPTION OF THE DRAWINGS

FIG. 1 is an elevational view showing a typical coil form used in the invention described herein.
FIG. 2 is a sectional view taken along line 2—2 of FIG. 1.
FIG. 3 is an enlarged view of the mounting feet shown on the coil form of FIG. 1.
FIG. 4 is an elevational view of a completed component processed in the manner taught herein.
FIG. 5 is a flow diagram of a method of device fabrication according to the invention.

DETAILED DESCRIPTION OF PREFERRED EMBODIMENTS

The term coil form as used herein relates to the structures such as shown in FIG. 1 of the drawings. However, it will be evident from the description to follow, and particularly to those skilled in this field, that the coil form may be modified to suit the desired application. Nevertheless, for convenience a description will be directed to the non-limiting form shown in FIG. 1.

Typically, a coil form comprises a cage 10, a mounting plate 12, and means such as feet 14 for mounting same on a circuit board (not shown). The problem solved by the present invention lies with the unique manner whereby suitable electrical connections are made possible between the electrical component and the circuit board.

The situation where the advantages of the present invention are more evident are in those cases where the coils are wound of very thin wire. In these cases, the wire is too thin such that it will not sustain nor support the coil form on the circuit board. Accordingly, a coil form such as shown in FIG. 1 is provided to receive the coil of wire, see FIG. 4. Generally, the coil form is made of a non-conductive material such as a thermo plastic. And, since the material is a plastic, the mounting plate 12 and feet 14 are molded along with the cage 10 to form an integral unit. While the coil form shown in the several figures indicate six feet 14, it should be evident that this number may vary and will be dictated in part by the number of wire leads to be connected thereto. In any event, the circuit board will be provided with an equivalent number of openings to receive the feet of the coil form. By procedures well known in the art, suitable connections may be made between the assembled coil form and the circuitry on the printed circuit board.

A careful consideration of FIGS. 2 and 3 will help to show how the unique advantages of this invention are realized. FIG. 2 is a view looking at the bottom of the coil form. Specifically, it shows a series of peripheral slots 16 around the mounting plate 12, which are aligned radially with the feet 14. In winding the coils in the manner such as shown in FIG. 4, a sufficient length of wire is left at the start and finish. These lengths of wire, hereinafter referred to as leads, are brought into engagement with the feet 14 by passing through the appropriate slot 16 where they are wrapped in a close-wound single-layer fashion over a substantial length of the foot 14. While the assembly in the figures show two coils, hence four leads, it should be again made clear that any number of windings may be employed for each of the coil forms. Thus, in order to separate the leads for connection into the electrical circuit, it is only necessary that there be at least one foot for each said lead.

After the wire leads have been wound about the feet 14 in the manner suggested above, the open end of the lead wire may be secured in a slot 18 at the base of foot 14.

When the coil leads are wrapped around the individual feet in the manner suggested above, a solder coat 15 is applied thereto bonding the individual turns of the wire forming a solid metallic cylinder around each of the wrapped feet. In those instances where the coil wire is not readily solderable, it may be desirable to pre-tin a sufficient length of the coil wire before wrapping on the foot.

With the steps outlined above, an efficient and effective procedure has been found to secure the terminal connections on a coil form such as a transformer. For convenience, it may be helpful to summarize the procedure by the following operations (see FIG. 5):

(1) Wind coil about form with ample leads therefrom,
(2) Wind leads individually about mounting feet projecting from the coil form,
(3) Apply solder coat to wound leads bonding the individual turns to one another forming a solid metallic cylinder on the mounting feet, and, if needed
(4) Insert loose ends of wire leads into slots and feet to complete the assembly. As an alternative, this latter step may precede operation 3.

It should be understood that the preceding is merely a description of the preferred embodiment of this invention, and that workers skilled in the art may after reading these specifications provide modifications thereto. Therefore, no limitation is intended to be imposed herein except as set forth in the appended claims.

The embodiments of the invention in which an exclusive property or privilege is claimed are defined as follows:

1. An electrical component comprising:
    a coil form made of a non-conductive material and having a cage portion adapted to receive a wire coil wound therearound, and a plurality of integral non-conductive mounting feet depending therefrom;
    one or more coils of wire wound around said cage portion and each having first and second lead portions;
    each of said lead portions being wound around a respective one of said mounting feet and over a substantial length thereof to form a single-layer close-wound wire wrapped foot; and
    a solder coat formed around each of said close-wound lead portions to bond the close-wound turns to one another and form a solid metallic cylinder and thereby provide conductive mounting terminals for said component.

2. The electrical component according to claim 1 wherein said coil form includes an integral mounting plate from which said mounting feet depend, and wherein said mounting plate includes a plurality of slots each formed in the periphery thereof and each adjacent a respective one of said mounting feet, and wherein each of said lead portions is disposed in part within a respective one of said slots.

3. The electrical component according to claim 1 wherein each of said mounting feet includes a slot in an end thereof, and each of said lead portions is secured within a respective slot.

4. A method of making an electrical component comprising the steps of:
    winding a coil of wire around a non-conductive coil form having non-conductive mounting feet integrally formed therewith and depending therefrom, and providing lead portions from said coil;
    winding each lead portion of said coil in close-wound single-layer fashion around respective ones of said mounting feet and along a substantial length thereof; and
    applying a solder coating to each of said closely wound lead portions to bond the close-wound turns to one another and form a solid metallic cylinder about each mounting foot and thereby provide conductive mounting terminals for said component.

5. The method according to claim 4 including the step of mechanically securing each end of said lead portions in a respective slot provided in each of said mounting feet.

References Cited
UNITED STATES PATENTS

| | | | |
|---|---|---|---|
| 294,549 | 3/1884 | Waring | 174—94 |
| 455,986 | 7/1891 | Hayes | 174—84VX |
| 1,171,591 | 2/1916 | Chubb | 336—192X |
| 2,215,366 | 9/1940 | Alden | 339—275(B) |
| 2,648,031 | 8/1953 | Lang | 336—192X |
| 2,963,678 | 12/1960 | Wolf | 336—192X |
| 3,267,409 | 8/1966 | Horowitz | 174—94VX |
| 3,405,379 | 10/1968 | Wilson | 336—192 |

E. A. GOLDBERG, Primary Examiner

U.S. Cl. X.R.

29—602,628; 336—65, 220